US012515133B2

(12) United States Patent
Sun

(10) Patent No.: US 12,515,133 B2
(45) Date of Patent: *Jan. 6, 2026

(54) METHOD AND DEVICE FOR ADJUSTING REGION, STORAGE MEDIUM, AND ELECTRONIC DEVICE

(71) Applicant: TENCENT TECHNOLOGY (SHENZHEN) COMPANY LIMITED, Guangdong (CN)

(72) Inventor: Xin Sun, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 66 days.

This patent is subject to a terminal disclaimer.

(21) Appl. No.: 18/668,618

(22) Filed: May 20, 2024

(65) Prior Publication Data

US 2024/0299850 A1 Sep. 12, 2024

Related U.S. Application Data

(63) Continuation of application No. 17/989,451, filed on Nov. 17, 2022, now Pat. No. 12,017,144, which is a (Continued)

(30) Foreign Application Priority Data

Nov. 16, 2018 (CN) ......................... 201811369245.6

(51) Int. Cl.
*A63F 13/56* (2014.01)
*A63F 13/52* (2014.01)
(Continued)

(52) U.S. Cl.
CPC .............. *A63F 13/56* (2014.09); *A63F 13/52* (2014.09); *A63F 13/533* (2014.09); *A63F 13/5378* (2014.09)

(58) Field of Classification Search
CPC .... A63F 13/52; A63F 13/533; A63F 13/5372; A63F 13/5378; A63F 13/55; A63F 13/56; A63F 2300/30; A63F 2300/306
See application file for complete search history.

(56) References Cited

U.S. PATENT DOCUMENTS 9,592,440 B1 * 3/2017 Sellers .................. A63F 13/795
2013/0005462 A1 * 1/2013 Miyamoto ............ A63F 13/843
463/31
(Continued)

FOREIGN PATENT DOCUMENTS

CN 107213643 A 9/2017
CN 107562303 A 1/2018
(Continued)

OTHER PUBLICATIONS

Written Opinion dated Jan. 23, 2020 from the International Searching Authority in International Application No. PCT/CN2019/115498.

(Continued)

*Primary Examiner* — Omkar A Deodhar
(74) *Attorney, Agent, or Firm* — Sughrue Mion, PLLC

(57) ABSTRACT

A region adjustment method, a storage medium, and an electronic apparatus are provided. The region adjustment method includes: determining a region allowing a target object to move in a map, the region comprising a first region that allows the target object to move without being harmed and participate in a target task in the map; determining scene objects set in the map; obtaining object types of the scene objects in a plurality of sub-regions of the first region; based on a sub-region among the plurality of sub-regions in which an object type of a scene object meeting a target condition in the first region, determining the sub-region in which the object type meets the target condition as a second region;
(Continued)

and switching the region allowing the target object to move from the first region to the second region.

20 Claims, 9 Drawing Sheets

Related U.S. Application Data continuation of application No. 17/185,002, filed on Feb. 25, 2021, now Pat. No. 11,529,559, which is a continuation of application No. PCT/CN2019/115498, filed on Nov. 5, 2019.

(51) Int. Cl.
*A63F 13/533* (2014.01)
*A63F 13/5378* (2014.01)

(56) References Cited

U.S. PATENT DOCUMENTS

2016/0332074 A1* 11/2016 Marr ........................ A63F 13/55
2018/0229121 A1* 8/2018 Tokuchi .................. A63F 13/52

FOREIGN PATENT DOCUMENTS

CN 108553891 A 9/2018
CN 108710525 A 10/2018
CN 109481939 A 3/2019
WO 2017/190228 A1 11/2017

OTHER PUBLICATIONS

Chinese Office Action for Application No. 201811369245.6 dated Jan. 27, 2021.
Lubishuoyouxi, https://baijiahao.baidu.c20180821om/s?id=1609388505461873707, Aug. 21, 2018, 6 pages.
International Search Report for PCT/CN2019/115498 dated Jan. 23, 2020.

* cited by examiner

METHOD AND DEVICE FOR ADJUSTING REGION, STORAGE MEDIUM, AND ELECTRONIC DEVICE

CROSS-REFERENCE TO RELATED APPLICATION(S)

This application is a Continuation Application of U.S. application Ser. No. 17/989,451 filed Nov. 17, 2022, which is a Continuation Application of U.S. application Ser. No. 17/185,002 filed Feb. 25, 2021, now U.S. Pat. No. 11,529, 559 issued on Dec. 20, 2022, which is a continuation of PCT/CN2019/115498, filed Nov. 5, 2019, and claims priority to Chinese Patent Application No. 201811369245.6, filed with the National Intellectual Property Administration, PRC on Nov. 16, 2018 and entitled "REGION ADJUSTMENT METHOD AND APPARATUS, STORAGE MEDIUM, AND ELECTRONIC APPARATUS", the disclosures of which are incorporated by reference herein in their entireties.

FIELD

Embodiments of the disclosure relate to the field of the Internet, and specifically, to a region adjustment technology.

BACKGROUND

With the development of multimedia technologies and the popularity of the wireless network, entertainment activities of people have become increasingly rich, such as playing an online game using a portable media device and playing a single-player game or an online game using a computer. There are various types of games, such as a barrage shooting game, an adventure game, a simulation game, a role-playing game, casual chess and card games, and other games.

In most types of games, a player may choose to play with other players. For example, when playing in a shooting game, a player may need to perform control to avoid an enemy's attack and fight back at the same time. When a target object controlled by the player is located on a special terrain, for example, when being located on the water surface, the target object controlled by the player needs to perform operations of swimming, avoiding enemy's shooting, adjusting gun's position to keep balance, and shooting simultaneously. Therefore, the complexities in which the player has to adjust point of views, control target objects, and other functions associated with the game environment, have been rapidly increasing.

SUMMARY

Embodiments of the disclosure provide a region adjustment method and apparatus, a storage medium, and an electronic apparatus, to resolve at least the technical problem of relatively high user operation complexity in related technologies.

According to an embodiment, there is provided a region adjustment method performed by an electronic device. The method includes: determining a region allowing a target object to move in a map, the region including a first region that allows the target object to move without being harmed and participate in a target task in the map; determining scene objects set in the map; obtaining object types of the scene objects in a plurality of sub-regions of the first region; based on a sub-region among the plurality of sub-regions in which an object type of a scene object meeting a target condition in the first region, determining the sub-region in which the object type meets the target condition as a second region; and switching the region allowing the target object to move from the first region to the second region.

According to an embodiment, there is provided a region adjustment apparatus, including: at least one memory configured to store computer program code; and at least one processor configured to access the memory and operate as instructed by the computer program code. The computer program code includes: first determining code configured to cause the at least one processor to determine a region allowing a target object to move in a map, the region including a first region that allows the target object to move without being harmed and participate in a target task in the map, and determine scene objects being set in the map; obtaining code configured to cause the at least one processor to obtain object types of scene objects in a plurality of sub-regions of the first region; second determining code configured to cause the at least one processor to, based on a sub-region among the plurality of sub-regions in which an object type of a scene object meeting a target condition in the first region, determine the sub-region in which the object type meets the target condition as a second region; and adjustment code configured to cause the at least one processor to switch the region allowing the target object to move from the first region to the second region.

According to an embodiment, there is provided a non-transitory computer-readable storage medium, storing at least one computer program code. The at least one computer program code, when executed by a processor, causes the processor to: determine a region allowing a target object to move in a map, the region including a first region that allows the target object to move without being harmed and participate in a target task in the map, and determine scene objects set in the map; obtain object types of the scene objects in a plurality of sub-regions of the first region; based on a sub-region among the plurality of sub-regions in which an object type of a scene object meeting a target condition in the first region, determine the sub-region in which the object type meets the target condition as a second region; and switch the region allowing the target object to move from the first region to the second region.

In accordance with certain aspects of the disclosure, when a region allowing a target object to move is narrowed in the map from a first region to a second region, the narrowed second region may not include geographical scenes unsuitable for combat, or may include relatively less geographical scenes for combat, so that the user does not need to perform operations related to avoiding environmental interference during performing other operations. Thus, the technical problem of relatively high user operation complexity in related technologies are resolved, thereby achieving a technical effect of reducing the complexity of user operation.

BRIEF DESCRIPTION OF THE DRAWINGS

The accompanying drawings described herein are used to provide more clear understanding of the embodiments of the disclosure. Exemplary embodiments set forth herein are only used to explain and practice the embodiments of the disclosure, and should not be construed as limitations to the scope of the disclosure.

DESCRIPTION

To make a person skilled in the art better understand one or more embodiments of the disclosure, the technical aspects of the embodiments described below with reference to the accompanying drawings. Apparently, the embodiments are merely some rather than all of the embodiments of the disclosure. All other embodiments derived or obtained by a person of ordinary skill in the art based on the embodiments of the disclosure without creative efforts shall fall within the protection scope of the disclosure.

In the disclosure, the terms such as “first,” “second,” etc. are used to distinguish different objects, but are not necessarily used for describing a particular sequence or a chronological order. Moreover, the terms “include,” “comprise”, and any other variants thereof may cover the non-exclusive inclusion. For example, a process, method, system, product, or device that includes a list of steps or units is not necessarily limited to those expressly listed steps or units, but may include other steps or units not expressly listed or inherent to such a process, method, product, or device.

In addition, some terms that appear in the descriptions of the embodiments may applicable to the following explanations:

First-person shooting game (FPS): the FPS may include a branch of action games (ACT) including a shooting game performed from a player’s subjective perspective.

Third-personal shooting game (TPS): the TPS is a type of shooting games. A difference between the TPS and the FPS is that a screen of the FPS only displays a visual field of a protagonist, while TPS emphasizes more on a sense of action, and a third person view on the protagonist can be seen on the game screen.

PlayerUnknown’s Battlegrounds (PUBG): the PUBG refers to a game in which a player confronts other players using tactical elements.

According to an aspect of the embodiments, a method embodiment of a region adjustment method is provided.

Figure 1:
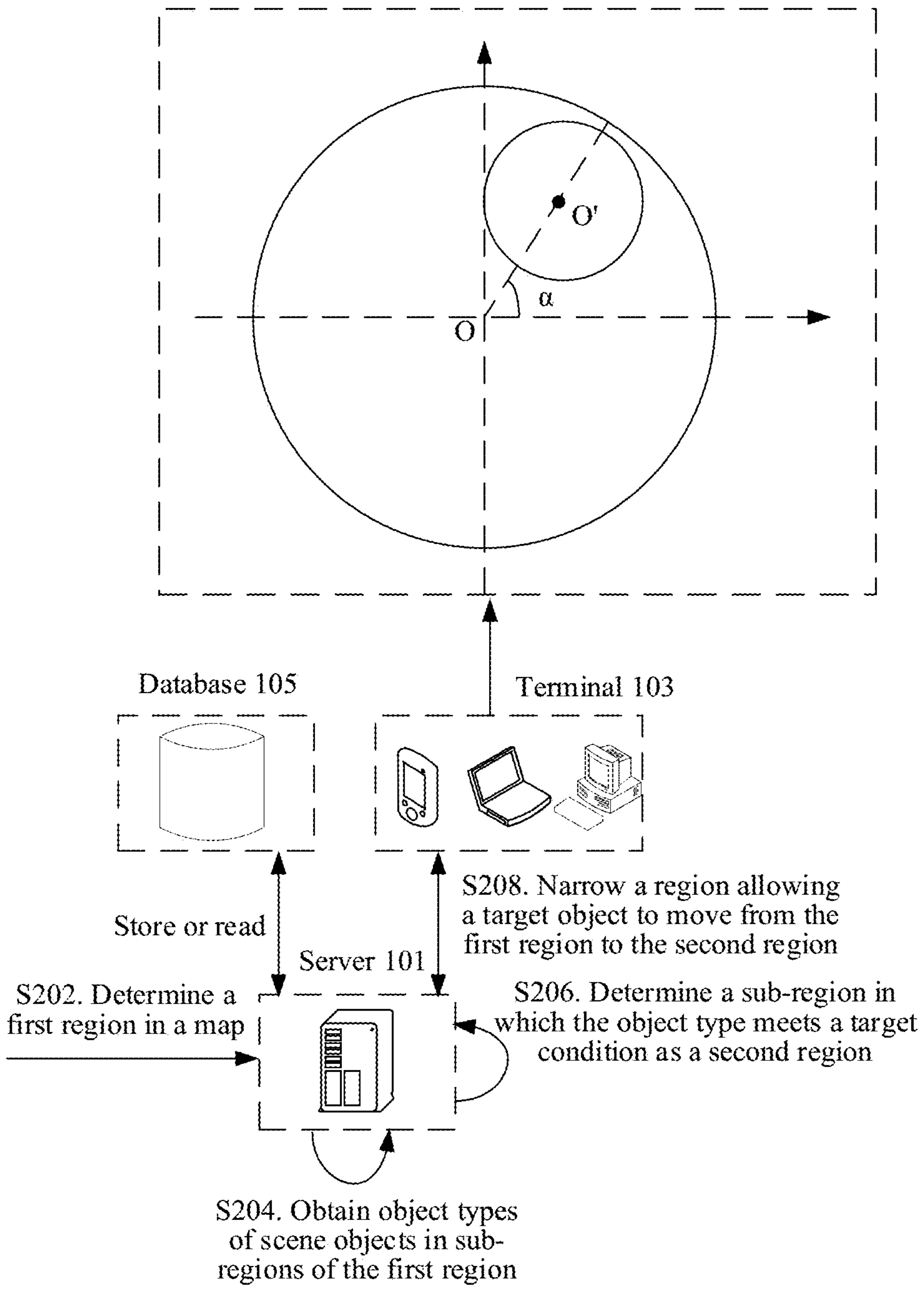
FIG. 1 is a schematic diagram of a hardware environment of a region adjustment method according to an embodiment.

FIG. 1 is a schematic diagram of a hardware environment of a region adjustment method according to an embodiment.

In an embodiment, the region adjustment method is applicable to an electronic device, and the electronic device may be a server or a terminal. The server may include a game server, an application server, or the like, but one or more embodiments are not limited thereto. The terminal may include a smart terminal such as a smartphone, a personal computer (PC), a personal digital assistant (PDA), a tablet computer, or another device, but one or more embodiments are not limited thereto.

The region adjustment method may be provided in a hardware environment that includes a server 101 and/or a terminal 103 shown in FIG. 1. As shown in FIG. 1, the server 101 may be connected to the terminal 103 through a network, and may be configured to provide a service (for example, a game service, an application service, or the like) for the terminal 103 or a client installed on the terminal 103. A database 105 may be configured on the server 101 or independently of the server 101, and is used for providing a data storage service for the server 101. The foregoing network includes, but is not limited to, a wide area network, a metropolitan area network, or a local area network.

The scenes according to various embodiments of the disclosure may include, but are not limited to a game scene, a virtual multidimensional social scenario, and the like. For example, a game may be a single-player game or a multi-player game. If the game is a single-player game, a player can participate in the game on the terminal 103 of the player, and perform the method according to the one or more embodiments through the terminal 103 or the server 101 providing game service for the terminal 103. In addition, a region allowing a target object to move safely (e.g., a safe movement region) may be narrowed with the passage of time, so that scene objects unsuitable for combat are excluded as much as possible. The descriptions of regions will be described in more detail below. Furthermore, if the game is a multi-player game, a plurality of players can be connected through a local area network or the Internet, and the players can participate in a game each of a plurality of terminals 103 used by each player. Alternatively, the method according to one or more embodiments may be performed through a major terminal 103 among the plurality of terminals 103 or a plurality of servers 101.

Figure 2:
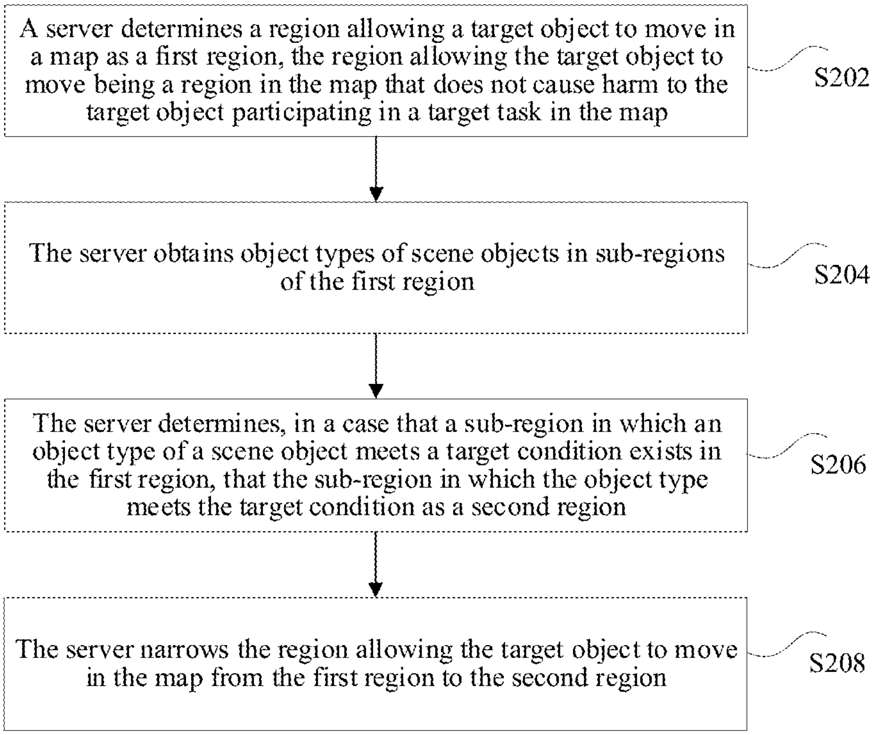
FIG. 2 is a flowchart of a region adjustment method according to an embodiment.

FIG. 2 is a flowchart of a region adjustment method according to an embodiment. The region adjustment method according to this embodiment may be performed by the server 101. As shown in FIG. 2, the method may include the following steps:

Step S202. A server determines a first region among a plurality of regions in which a target object is allowed to move in a map without being harmed or attacked.

The first region allowing the target object to move is a region in the map that does not cause harm to the target object participating in a target task in the map, and scene objects are set in the map.

The scene object is an environment object (for example, mountains, rivers, lakes, sea, buildings, or the like) in a virtual scene. The virtual scene is a scene of an application that allows a target task to be performed, such as a game application, a military simulation application, or a social application. For the unity of description, the following descriptions use the game application as an example. A game type of the game application includes, but is not limited to, a barrage game, a shooting game (such as an FPS game or a TPS game), an adventure game, a casual game, a multi-player online battle arena game, and the like.

The target task may be a game task in the game application, for example, a round of game. A map may be used for arranging the foregoing virtual scene. The map can be divided into two or more regions in each time period, namely a safe region (that is, a region allowing the target object to move without being attacked or harmed by other objects) and a non-safe region. For example, in a first time period, the map is divided into a first region and a third region. The third region may be a region in which objects of a game application can cause harm to a target object (for example, a game subject controlled by a player) participating in the target task in the first time period in the map, that is, a non-safe region; and the first region may be a region in the map other than the third region, and the objects of the game application may not cause harm to the target object participating in the target task in the first region, that is, a safe region.

Step S204. The server obtains object types of scene objects in sub-regions of the first region.

The object types are types of the environment objects, for example, mountains, rivers, lakes, seaside, cliffs, buildings, and the like.

Step S206. The server determines, based on an object type of scene objects of a sub-region meeting a target condition imposed in the first region, the sub-region in which the object type meets the target condition as a second region.

The second region may be a region allowing the target object to move in a second time period. The second region does not cause harm to the target object participating in the target task, and a start time of the second time period may not be earlier than an end time of the first time period.

The scene object in the map may be divided into a type suitable for combat and a type unsuitable for combat. For example, in a shooting game, the water surface and the cliff are scenes unsuitable for combat, and the flat ground and roadway are scenes suitable for combat. The foregoing target condition may be used for selecting sub-regions not including the scene objects of the types unsuitable for combat, or sub-regions including less scene objects of the types unsuitable for combat relative to other sub-regions.

Step S208. The server narrows the region allowing the target object to move in the map from the first region to the second region.

The server may transmit a result that the region allowing the target object to move from the first region to the second region is narrowed, to the terminal, to facilitate the terminal displaying the result that the region allowing the target object to move is narrowed from the first region to the second region on a client.

The server may gradually narrow the region allowing the target object to move from the first region to the second region. That is, the server may transmit an execution result of gradually narrowing the region allowing the target object to move in the map from the first region to the second region to the terminal by displaying a process animation or a visual effect that gradually narrows the region allowing the target object to move in the map from the first region to the second region.

In the foregoing embodiments, the safe region may change from the first region to one of the sub-regions of the first region (that is, the second region). As the first region changes to the second region, the safe region narrows or becomes smaller continuously. During a game, as the safe region narrows, the player who deliberately hides in order not to be attacked to death will lose more ground of the safe region, thus preventing such players from hiding indefinitely throughout the game process. In addition, a game can end within a controllable time period, thereby improving the user experience for all players. In the process of narrowing the safe region, the scene objects of the types unsuitable for combat may be excluded as much as possible, while the scene objects of the types suitable for combat are retained as much as possible. In the region suitable for combat, the player can focus on the operations required for combat without performing operations for eliminating environmental interference (for example, keep a balance of the gun while swimming, and avoid falling off the cliff when moving on the edge of the cliff), thereby reducing operation complexity of the player in the game.

If the one or more embodiments of the disclosure are applied to the FPS game or TPS game, for example, the PUBG game, a region in which a target object controlled by a player is allowed to move may be a circle, and in the circle region (that is, the safe region), the target object may not be hurt or attacked. Outside the circle region (that is, the non-safe region), the target object may be attacked by other objects or may be hurt, which may force the player to enter the circle region. As time goes by, the circle region may be continuously narrowed, and eventually may be disappeared or may be narrowed to a point. In the entire process, because the movement region or the safe region is narrowed and the target object is exposed to a region for combat for longer periods with the passage of time, the player is in a status of fierce combat for relatively longer. As such, the player can operate the game more easily during the combat regardless of environmental interference.

The foregoing embodiment uses an example in which the region adjustment method according to the one or more embodiments are performed by the server 101. However, the region adjustment method according to one or more embodiments may also be performed by the terminal 103. The difference is that the execution body is changed from the server to the terminal. If the game is a single-player game, the terminal performing the region adjustment method may be a terminal participating in the game; and if the game is a multi-player game, the terminal performing the region adjustment method may be a major terminal in a plurality of terminals participating in the game. The major terminal transmits an execution result (that is, the region allowing the target object to move is narrowed from the first region to the second region) to other terminals through interconnected networks, so as to facilitate all terminals displaying "narrowing the region allowing the target object to move in the map from the first region to the second region" on the clients. The region adjustment method according to the embodiments performed by the terminal may alternatively be performed by the client installed on the terminal.

According to the foregoing step S202 to step S208, the server narrows the first region forcing or allowing the target object to move in the map from the first region to the second region. When the second region is also narrowed, the narrowed second region does not include geographical scenes for combat or includes relatively less geographical scenes for combat, thus, resolving the technical problem of relatively high user operation complexity in the related art and achieving a technical effect of reducing user operation complexity.

The one or more exemplary embodiments applied to a game will be described in more detail below with reference to the steps shown in FIG. 2.

In step S202, a playing method of the FPS is that multiplayers (Player vs. Player, PVP) can be performed in a minimap, and the playing method according to the one or more embodiments is to replace the minimap with a big map. The chance of encountering each other between the players is improved by continuously narrowing the safe region in the map and allowing the players to move in the combat region, thereby increasing attentiveness of the players. The movement region of the player may be a circle (or may be a square or a rhombus, and the circle is used as an example for description subsequently). As game time goes by, the circle region is continuously narrowed, but each newly-formed circle region may be disposed within the original circle region. According to an embodiment, the server may determine a first region in the map which is a safe region (that is, the region allowing the target object to move) in the first time period. The region allowing the target object to move is a region in the map that does not cause harm to the target object participating in a target task in the map, and scene objects are set in the map.

In step S204, in a process of participating in the FPS game, although the safe region for the players to move may be continuously narrowed, and the circle region is urged to randomly appear in each position in the map to make the players to meet in different terrains. However, there is a problem that the circle region is easy to randomly appear in the terrains difficult for combat. To overcome such problem, the server may filter some terrains such as the sea, mountains, and cliffs that are unsuitable for combat, and may ensure the randomness of the circle region at the same time. For example, the use of a whitelist-based circle selection algorithm can both ensure the randomness and the rationality of the terrain simultaneously. The server may obtain the object type of the scene object in the sub-region of the first region by using the whitelist-based circle selection algorithm.

Because the foregoing scene objects are objects representing environmental props in a virtual scene, the object type represents a type of the environmental props, for example, mountains, rivers, lakes, seaside, cliffs, buildings, or grass.

In step S206, based on an object type of a scene object of a sub-region meeting a target condition imposed on the first region, the server may determine the sub-region in which the object type meets the target condition as a second region. The second region is a region in the second time period that does not cause harm to the target object participating in the target task, that is, the second region is a safe region in the second time period, and a start time of the second time period is not earlier than an end time of the first time period.

In the foregoing embodiment, the first region may include a plurality of sub-regions, and each of the plurality of sub-regions may not overlap each other. However, the embodiment is not limited thereto, and a positional relationship between at least two sub-regions may be completely different, and other regions among the plurality of regions may be partially overlapped. The server may divide the object type into a first type and a second type in advance, where the first type is a type suitable for combat, and the second type is a type unsuitable for combat.

Moreover, before the server obtains the object type of the scene object in the sub-region of the first region, the server may determine the sub-region of the first region according to the following manners.

As time goes by, the safe region (e.g., first region) in the game is continuously narrowed. In other words, each time period has a safe region of a corresponding size, and the size of the safe region may be represented by using a parameter (recorded as a second parameter, for example, a radius of a circle). For example, a first radius of the first region may stay constant for the first time period. Here, the first radius may be a first parameter. For the second time period, the server may obtain a second radius matching the second time period. Here, the second radius may be a second parameter. The server determines, in the first region, a circle or a loop with the second radius as a sub-region of the first region, where the first radius is greater than the second radius. The second time period is a time period in which the region allowing the target object to move is the second region, a start time of the second time period is not earlier than an end time of the first time period, and the first time period is a time period in which the region allowing the target object to move is the first region.

Figure 3:
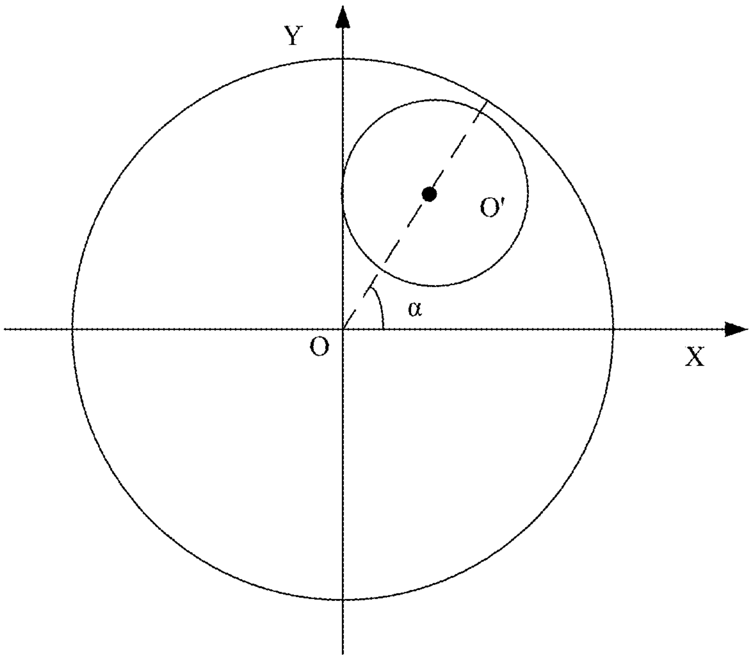
FIG. 3 is a schematic diagram for describing a method of determining a center of a circle according to an embodiment.

In addition, when the server determines, in the first region, the circle with the second radius as the sub-region of the first region, the server may generate a random number r by using a random number generator, the random number r being between 0 to 1. As shown in FIG. 3, the server determines a radius of an angle $r*\pi$ (recorded as $\alpha$) in the first region as a target radius, for example, a radius shown by a dotted line in FIG. 3. The server searches, on the target radius, for a point that is distant from a center of the circle of the first region by a distance between O and O' (i.e., a third parameter) as a center of a circle of the sub-region of the first region (i.e., the second region). For example, the point O' in FIG. 3 may be determined according to a product of a square root (that is, $\sqrt{r}$) of the random number r. A fourth parameter R may be a difference between the first radius of the first region and the second radius of the sub-region of the first region (i.e., the second region).

In the foregoing embodiments, the determining, by the server, based on an object type of a scene object of a sub-region meeting a target condition in the first region, the sub-region in which the object type meets the target condition as a second region including: searching, by the server, the sub-regions of the first region for a first sub-region that meets the target condition, the first sub-region including a scene object whose object type is a first object type. In this case, the target condition is that the object types of the scene objects in the sub-regions are the first object type, or none of the object types of the scene objects in the first sub-regions are a second type. In this case, the target condition is that none of the object types of the scene objects in the sub-regions are the second type; and the server sets the second region according to the first sub-region.

In an embodiment, the searching, by the server, the sub-regions of the first region for a first sub-region that meets the target condition may include the following steps. In Step 1, the server obtains a whitelist, the whitelist storing object identifiers of scene objects whose object types are the first object type. In other words, the whitelist stores identifiers of the terrain type suitable for combat. In Step 2, the server searches the whitelist that includes an object identifier of the scene objects in the sub-region of the first region, that is, the server checks whether the first region includes terrains suitable for combat. In Step 3, the server determines a sub-region in which an object identifier of a scene object exists in the whitelist as the first sub-region.

In another embodiment, the searching, by the server, the sub-regions of the first region for a first sub-region that meets the target condition may include the following steps. In Step 1, the server obtains a blacklist, the blacklist storing object identifiers of scene objects whose object types are the second type. In other words, the blacklist stores identifiers of the terrain type unsuitable for combat. In Step 2, the server searches the blacklist that includes an object identifier of any scene object in the sub-region of the first region, that is, the server checks whether a current sub-region includes terrains unsuitable for combat. In Step 3, the server determines the sub-regions in which an object identifier of the scene objects does not exist in the blacklist as the first sub-region.

In another embodiment, the searching, by the server, the sub-regions of the first region for a first sub-region that meets the target condition may include the following steps. In Step 1, the server obtains a whitelist and a blacklist. In Step 2, the server searches, in each of the sub-regions, for a scene object (recorded as a first scene object) whose object identifier exists in the whitelist, and searches, in each of the sub-regions, for a scene object (recorded as a second scene object) whose object identifier exists in the blacklist. In Step 3, the server determines a sub-region in which a quantity of the first scene objects is greater than a quantity of the second scene objects as a first sub-region, or, the server determines a sub-region in which an occupied area of the first scene objects is larger than an occupied area of the second scene object as a first sub-region.

In the foregoing embodiments, to ensure the largest possible region suitable for combat, based on determining that there are a plurality of first sub-regions, the server sets the second region according to the following steps. In Step 1, the server obtains an area of each of the first sub-regions occupied by a scene object whose object type is the first object type in the first sub-region. In Step 2, the server determines a second sub-region from the plurality of first sub-regions, an area of the second sub-region being not less than an area of any other first sub-region, or, in the second sub-region, an occupied area ratio of the second sub-region is not less than an occupied area ratio of any other first sub-region in a corresponding sub-region. In Step 3, the server sets the second sub-region as the second region.

In another embodiment, to ensure as many terrains suitable for combat as possible, based on determining that there are a plurality of the first sub-regions, that the server sets the second region according to the following steps. In Step 1, the server obtains an object parameter of each of the first sub-regions, the object parameter being a quantity of scene objects whose object types are the first object type in the first sub-region. In Step 2, the server determines a third sub-region from the plurality of first sub-regions, an object parameter of the third sub-region being not less than object parameters of any other first sub-regions. In Step 3, the server sets the third sub-region as the second region.

According to the foregoing embodiments, after a game starts for a time period, two circles, a large circle and a small circle may be refreshed (the large circle may be considered as the first region, and the small circle may be considered as the second region). The large circle is a current safe movement region, and the small circle is a movement target of the large circle. As time goes by, the large circle steadily changes to the small circle, and eventually becomes the small circle, indicating an end of the first time period. Next, a new small circle randomly selects a new position in a range of the small circle, the small circle waits for a time period before moving to a new small circle position, and the operation of narrowing the first region may be performed repetitively according to the above-described embodiment.

In step S208, the server may gradually narrow the region allowing the target object in the map to move from the first region to the second region.

Here, a buffering time period may be configured between the first time period and the second time period. In this buffering time period, a process animation that the safe region is gradually narrowed from the first region to the second region may be played on game clients. For example, the process animation shows that a boundary of the safe region is a boundary of the first region at first, and then the boundary gradually approaches to a boundary of the second region until overlaps with the boundary of the second region.

The following description explains the whitelist in more detail.

Figure 4:
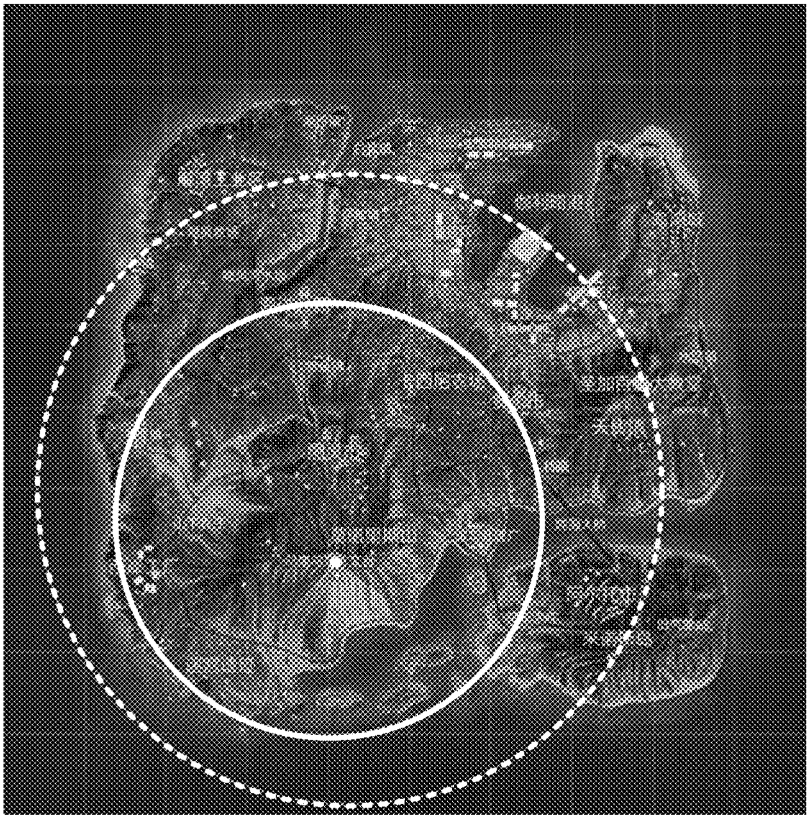
FIG. 4 is a schematic diagram of a game interface according to an embodiment.

Determining a game region is essentially determining a center and a radius of a circle. According to one or more embodiments, movement regions may be defined as a set of circles (circle 1, circle 2, . . . , circle N), radii of circle 1 to circle N may decrease in order, and a region of circle N is included in circle N−1. Only a circle movement region (that is, a current safe region, the foregoing first region)and a target region (that is, a next safe region, the foregoing second region) appear at the same moment. Without considering time, relative positions of the circle movement region and the target region are shown in FIG. 4. Here, radius lengths of circle 1 to circle N (only two circles are shown in FIG. 4) are fixed, and a position of the center of circle is randomly selected on the map. After the position of the center of circle N−1 is determined, a position of the center of circle Nis randomly selected in a range of circle N−1. While the related art may have a configuration of randomly selecting a center of circle, it does not necessarily consider the geographical environment of the map.

Although the FPS game can continuously narrow the movement region of the players to make the players to meet in different terrains, however, there is a problem that randomly selecting a terrain makes it difficult for players to carry out a combat. Accordingly, one or more embodiments provide a whitelist-based circle selection algorithm that can both ensure the randomness and the rationality of the terrains.

For example, in a big map FPS game, players may appear in any corner of the big map. To improve interestingness of the game and make the players meet each other, a playing method of bringing the players together is needed, and a circle narrowing mechanism is generated accordingly. After the game starts for a period, two circles shown in FIG. 4 appear. A large circle continuously moves to a small circle as time goes by, and eventually overlaps with the small circle. In this case, the small circle randomly appears at a new position in a range of the large circle, and a new stage is started. The players do not lose health point in the large circle, while continuously lose health point outside the large circle, thereby driving everyone into the circle.

In each stage, when the large circle overlaps with the small circle, a position of a new small circle randomly appears in a random position in the large circle. However, the random position needs to avoid some regions unsuitable for combat for the players. For example, sea, mountains, and cliffs. After the game is optimized by using an algorithm according to the one or more embodiments, combat positions for the players become very random during a circle narrowing process at each stage, and terrains that hinder the players from combating do not appear.

In addition, every time the circle is start to narrow on the big map, the randomness and rationality of the small circle need to be ensured. Because each time a new small circle needs to be in the range of the large circle, and a radius of the new small circle is fixed, this problem may be simplified to a random selection of a center of the new small circle. A selection algorithm of the center of the small circle may ensure the randomness of the position of the new small circle and the rationality of the environmental objects in the small circle.

Figure 5:
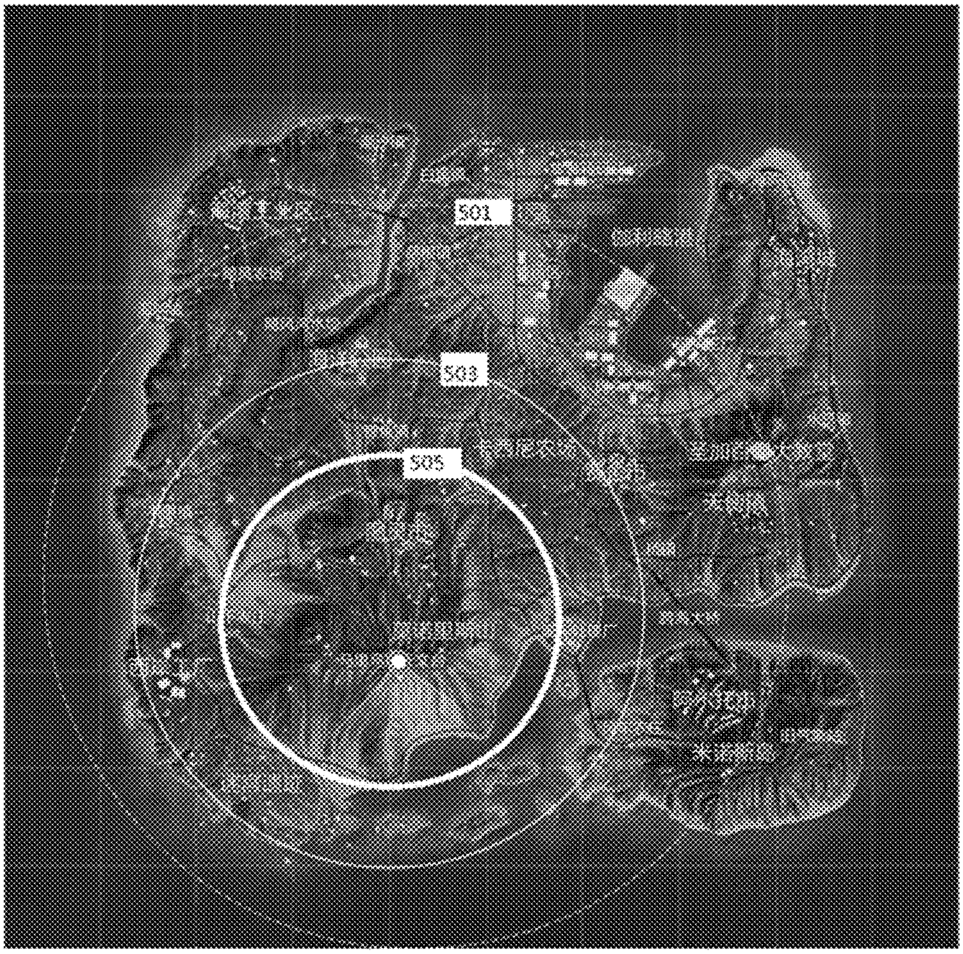
FIG. 5 is a schematic diagram of a game interface according to an embodiment.

Because the radius of the small circle is fixed, as shown in FIG. 5, selected regions of the center of the small circle is limited in a range shown by a circle 505. Once a new center of circle exceeds the region shown by the circle 505, it indicates that the circle does not meet a requirement.

Figure 6:
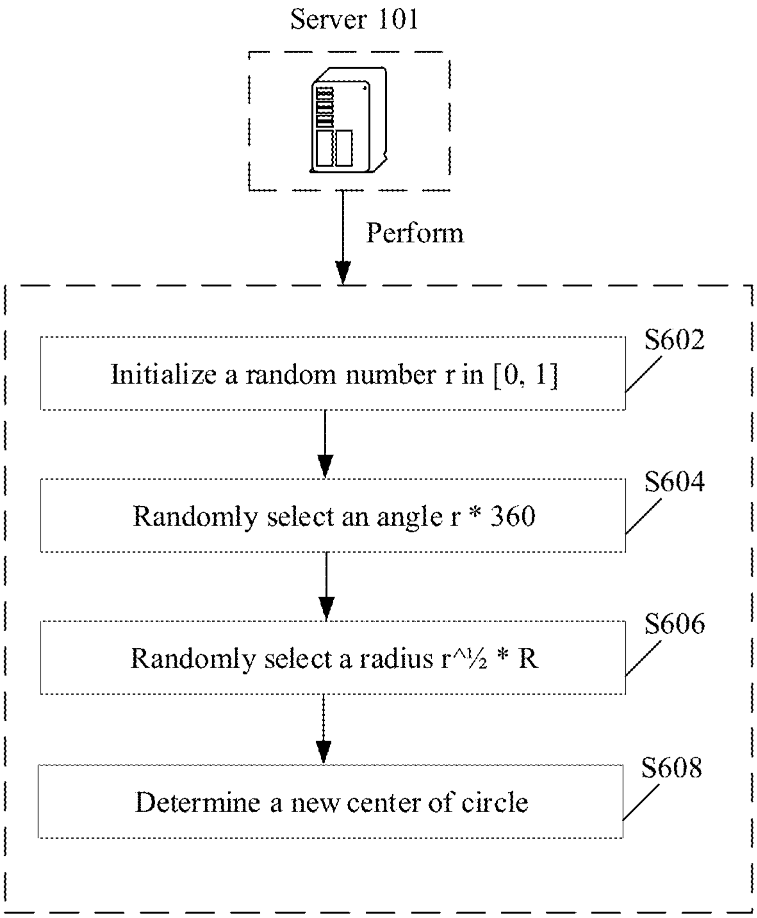
FIG. 6 is a flowchart of a method of determining a center of a circle according to an embodiment.

After the server determines an approximate range of the center of circle, a random algorithm of the center of circle shown in FIG. 6 is used to randomly generate a center of circle in the region shown in the circle 505.

In Step S602, the server initializes a random number r in [0, 1].

In an embodiment, polar coordinates may be used. That is, the server first initializes a random number generator to generate the random number r in polar coordinates [0, 1].

In Step S604, the server selects an angle r*360 (or r*π), and determines an angle r*360 of the center of small circle in the polar coordinates.

In Step S606, the server randomly selects a radius r^½*R. Here, r^½ may also be represented as a square root of r.

The server determines a maximum radius difference R between the new small circle and the old small circle in the polar coordinates, and calculates a random radius of the new small circle according to the formula r^½*R.

In Step S608, the server determines a new center of circle.

The server calculates new coordinates of the center of small circle according to the angle and radius difference, and then the randomness of the coordinates of the center of circle can be ensured.

By using the foregoing random algorithm of the center of circle, a new small circle 503 may be generated in a circle 501 shown in FIG. 5, and the randomness of generating the center of circle may be ensured. An additional algorithm may be used to ensure rationality of scene objects in the circle.

Figure 7:
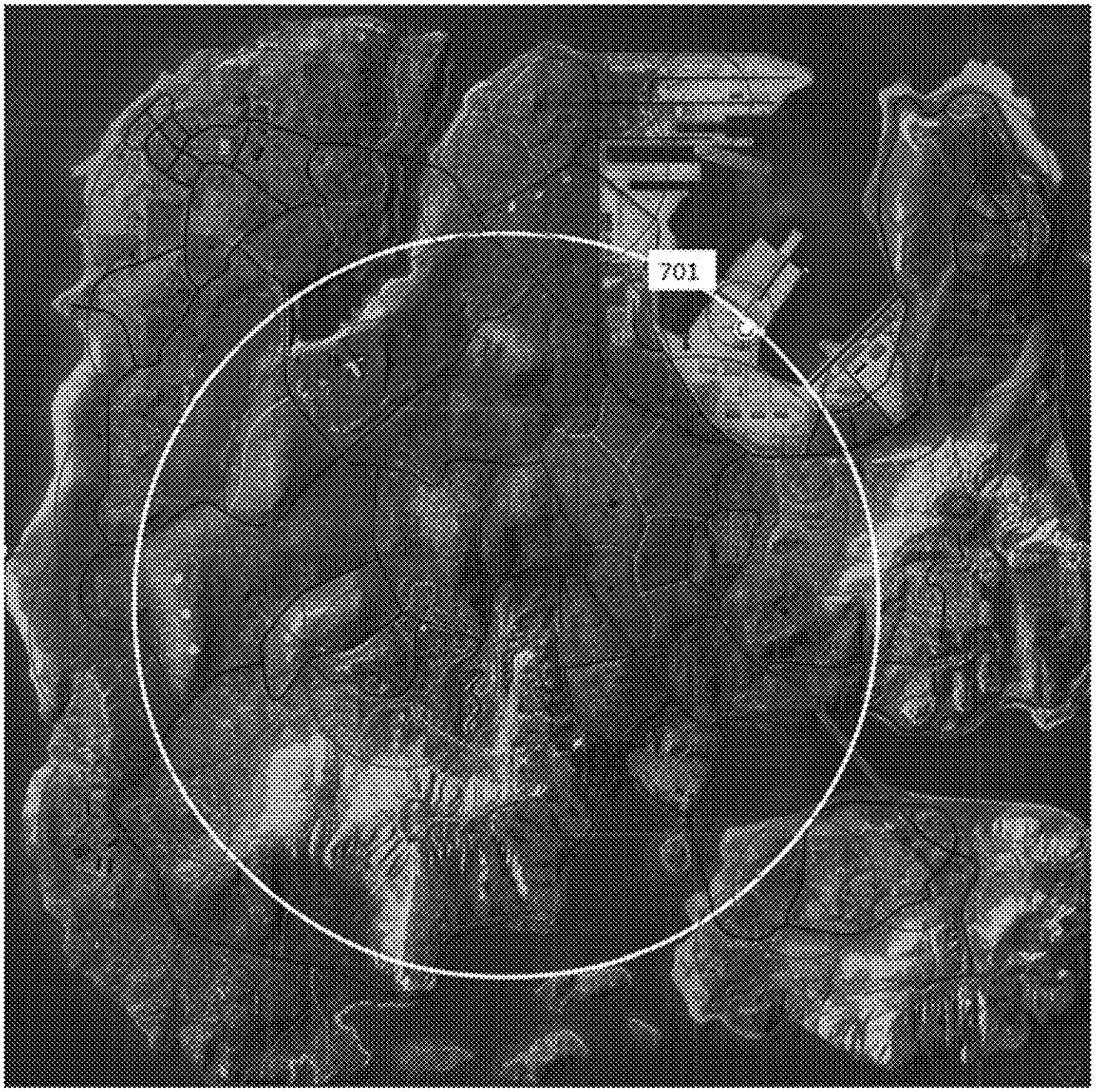
FIG. 7 is a schematic diagram of a game interface according to an embodiment.
Figure 8:
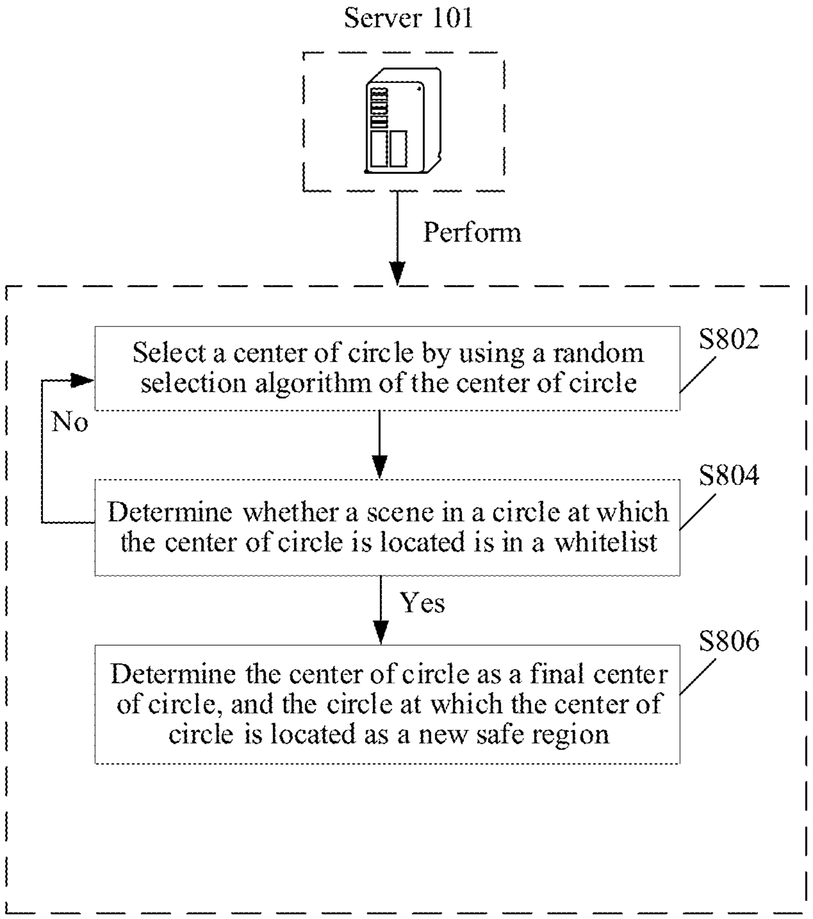
FIG. 8 is a flowchart of a method of determining a safe region according to an embodiment.

According to an embodiment, a whitelist may be filtered in such a way to determine a whitelist region. A whitelist region may be designed as a circle (or in other shapes). A plurality of groups of the whitelist regions are selected on a big map in advance, and the whitelist regions need to avoid some terrains unsuitable for combat, for example, sea, mountains, and cliffs. Circles other than a circle 701 in FIG. 7 are the whitelist regions selected in the actual project. The random algorithm shown in FIG. 6 may be used each time for randomly generating a center of small circle, and then verifying whether the generated small circle is in the whitelist region (or verifying whether the terrains suitable for combat are included in the whitelist). If the generated small circle is in the whitelist region, a position of the center of circle may be determined as a final position of the center of circle, if the generated small circle is not in the whitelist region, iteration attempts can be repeated. In actual experiment processes, a quantity of times of iteration is relatively small. For example, when at most 100 times of iteration are selected, probability that the generated small circle is not in the whitelist region may be negligible, and the entire selection process is shown in FIG. 8.

In Step S802, the server selects a center of circle by using a random selection algorithm of the center of circle shown in FIG. 6.

In Step S804, the server determines whether a scene of the circle at which the center of circle is located is in the whitelist, if the scene of the circle at which the center of circle is located is in the whitelist, perform step S806, and if the scene of the circle at which the center of circle is not located is in the whitelist, perform step S802 to enter a next round of iteration.

In Step S806, the server determines the center of circle as a final center of circle, and a circle at which the center of circle is located is a new safe region.

Figure 9:
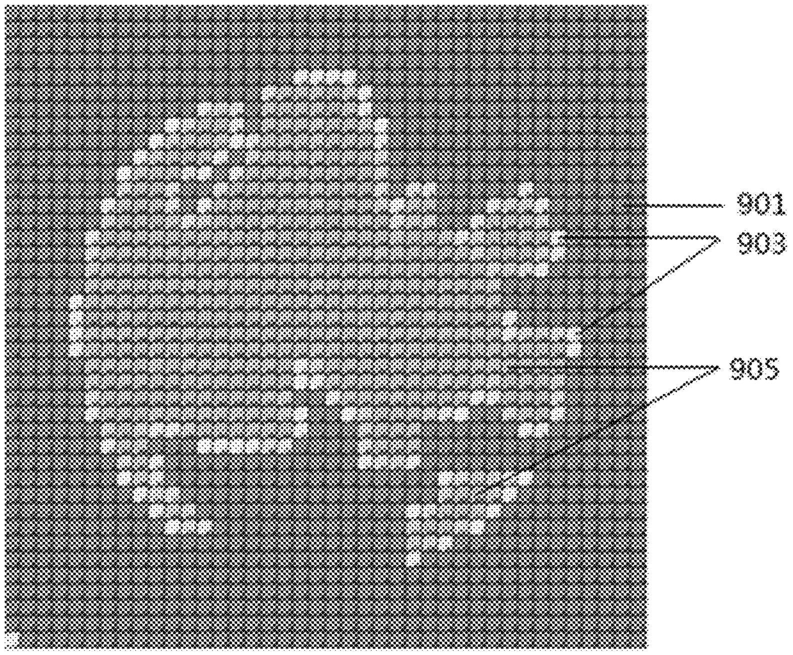
FIG. 9 is a schematic diagram of a game interface according to an embodiment.

According to an embodiment shown in FIG. 9, a big map may be divided into a plurality of small blocks, and a probability of the center of circle falling on each block can be counted by using the block as a unit. According to the foregoing process, a distribution map of the center of circle shown in FIG. 9 is obtained by testing for tens of thousands of times. Surrounding regions in which blocks having the same color as that of a block 901 are located are regions with a probability of 0, and the center of circle does not fall in this region. A region in which blocks having the same color as that of squares 903 are located is an edge transition region, the probability of distribution of the center of circle is relatively low, and the center of circle seldom falls in this region. A quantity of times that the center of circle falls in each block in a region in which blocks having the same color as that of blocks 905 are located is average, and a probability that the center of circle falls in a center region of the big map and a probability that the center of circle falls in a peripheral region of the big map are consistent. Moreover, it can be seen from the distribution map that, the range randomly selected by the center of circle effectively avoids a series of terrains that are difficult for combat, such as sea, mountains, and cliffs.

Accordingly, both the randomness and narrowing the circle may be considered by using the foregoing random algorithm of the center of circle and a whitelist rule. It does not only ensure that different regions will be randomly selected in each round of game, but also ensure that safe regions do not fall in terrains difficult for combat.

An algorithm according to an embodiment may first select a center of a circle by using a selection algorithm, and then the server verifies whether the center of the circle is in the whitelist. If the center of the circle is in the whitelist, the center of the circle is valid, and if the center of the circle is not in the whitelist, the operation of determining the center of a circle may be iteratively performed until the center of circle in the whitelist is selected. Alternatively, a blacklist manner may also be used and replace the whitelist. The selection algorithm for the center of a circle involves first selecting the center of a circle by using the selection algorithm, and then the server verifies whether the selected center of the circle is in the blacklist. If the selected center of the circle is not in the blacklist, the center of circle is valid, and if the center of circle is in the blacklist, the iteration continues. Both algorithms may achieve objectives, and there is no essential difference between the two.

The foregoing embodiments are described as a series of combination of steps or actions. However, a person skilled in the art should understand that the one or more embodiments are not limited thereto, and the sequence of steps or actions may be performed by using another sequence or may be simultaneously performed. In addition, a person skilled in the art should understand that the embodiments described herein are exemplary embodiments, and the related actions and modules are not necessarily listed in the exemplary embodiments.

According to the foregoing descriptions, a person skilled in the art may learn and practice the one or more embodiments implemented by using software and hardware, or certainly may be implemented by using hardware. Based on such an understanding, the technical solutions in the disclosure may be implemented in the form of a software product. The computer software product may be stored in a storage medium (for example, a read-only memory (ROM)/random access memory (RAM), a magnetic disk, or an optical disc), and include one or more instructions for instructing an electronic device (which may be a smartphone, a computer, a server, a network device, or the like) to perform the method described in the embodiments of the disclosure.

According to another aspect of the disclosure, a region adjustment apparatus for implementing the foregoing region adjustment method is further provided.

Figure 10:
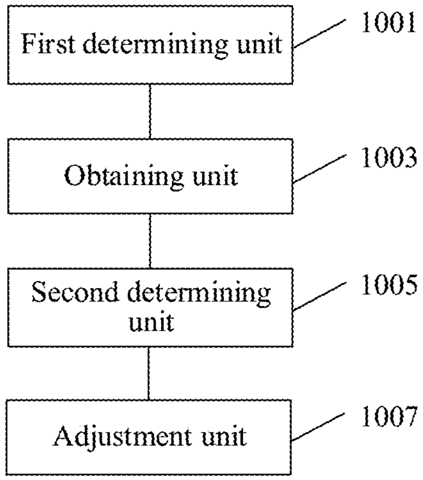
FIG. 10 is a block diagram of a region adjustment apparatus according to an embodiment.

FIG. 10 is a schematic diagram of a region adjustment apparatus according to an embodiment. As shown in FIG.

10, the apparatus may include: a first determining unit 1001 configured to determine a region allowing a target object to move in a map as a first region, the region allowing the target object to move being a region in the map that does not cause harm to the target object participating in a target task in the map, and scene objects being set in the map; an obtaining unit 1003 configured to obtain object types of scene objects in sub-regions of the first region; a second determining unit 1005 configured to determine, based on an object type of a scene object of a sub-region meeting a target condition exists in the first region, that the sub-region in which the object type meets the target condition as a second region; and an adjustment unit 1007 configured to narrow, in the map, the region allowing the target object to move from the first region to the second region.

In the foregoing embodiments, the safe region changes from the first region to one of the sub-regions (that is, the second region), that is, the safe region narrows continuously. During a game, as the safe region narrows, the player who deliberately hides in order not to be sniped to death can only move toward the safe region as the safe region narrows, thus avoiding influence of infinite hiding on the game process, so that a game can end within a controllable time period, thereby improving the user experience. In the process of narrowing the safe region, the scene objects of the types unsuitable for combat are excluded as much as possible, while the scene objects of the types suitable for combat are retained as much as possible. In the region suitable for combat, the player can focus on the operations required for combat as much as possible without performing operations for eliminating environmental interference (for example, keep a balance of the gun while swimming, and avoid falling off the cliff when moving on the edge of the cliff).

The first determining unit 1001 in this embodiment may be configured to perform step S202 of FIG. 2; the obtaining unit 1003 in this embodiment may be configured to perform step S204 of FIG. 2; the second determining unit 1005 in this embodiment may be configured to perform step S206 of FIG. 2; and the adjustment unit 1007 in this embodiment may be configured to perform step S208 of FIG. 2.

Examples implemented by the foregoing modules and corresponding steps and application scenarios of the foregoing modules and corresponding steps may correspond to those described above with respect to one or more method embodiments, but are not limited thereto. The modules may be run in the hardware environment shown in FIG. 1 as a part of the apparatus, and may be implemented by software or may be implemented by hardware.

When the region allowing the target object to move in the map is gradually narrowed from the first region to the second region, the narrowed second region does not include geographical scenes unsuitable for combat or includes relatively less geographical scenes unsuitable for combat, thus resolving the technical problem of relatively high user operation complexity in related technologies, thereby achieving a technical effect of reducing user operation complexity.

The second determining unit 1005 may include: a search module configured to search the sub-regions of the first region for a first sub-region that meets the target condition, the first sub-region including a scene object whose object type is a first type, and the first type being a type suitable for combat; and a setting module configured to set the second region according to the first sub-region.

The search module may include: a first obtaining submodule, configured to obtain a whitelist, the whitelist storing object identifiers of scene objects whose object types are the first type; a search submodule, configured to search whether the whitelist includes an object identifier of any scene object in the sub-regions of the first region; and a determining submodule, configured to determine a sub-region in which an object identifier of a scene object exists in the whitelist as the first sub-region.

When there are a plurality of the first sub-regions, the setting module may include: a second obtaining submodule configured to obtain an area of a target region in each of the first sub-regions, the target region being a region occupied by a scene object whose object type is the first type in the first sub-region; a third obtaining submodule configured to determine a second sub-region from the plurality of first sub-regions, the area of the target region in the second sub-region being not less than the area of the target region in any other first sub-region; and a first setting submodule configured to set the second sub-region as the second region.

In addition, when there are a plurality of the first sub-regions, the setting module may include: a fourth obtaining submodule configured to obtain an object parameter of each of the first sub-regions, the object parameter being a quantity of scene objects whose object types are the first type in the first sub-region; a fifth obtaining submodule, configured to determine a third sub-region from the plurality of first sub-regions, the object parameter of the third sub-region being not less than the object parameter of any other first sub-region; and a second setting submodule configured to set the third sub-region as the second region.

Moreover, the apparatus according to an embodiment further includes: a parameter obtaining unit configured to obtain a first parameter matching the second time period before object types of scene objects in sub-regions of the first region are obtained, where the second time period is a time period in which the region allowing the target object to move is the second region, a start time of the second time period is not earlier than an end time of the first time period, and the first time period is a time period in which the region allowing the target object to move is the first region; and a third determining unit configured to determine, in the first region, a circle with the first parameter as a radius as the sub-region of the first region, where a radius of the first region is a second parameter, and the second parameter is greater than the first parameter.

When the third determining unit determines, in the first region, a circle with the first parameter as a radius as the sub-region of the first region, a random number r may be generated by using a random number generator, where the random number r is between 0 and 1; a radius of an angle $r*\pi$ in the first region is determined as a target radius; a point that is distant from a center of circle of the first region by a third parameter is searched on the target radius as a center of circle of the sub-region of the first region, where the third parameter is a product of a square root of the random number r and a fourth parameter, and the fourth parameter is a difference between the radius of the first region and the radius of the sub-region of the first region.

The apparatus according to an embodiment may further include: a dividing unit configured to divide the map into the first region and a third region before a region in the map allowing a target object to move is determined as a first region, the third region being a region that continuously causes harm to the target object participating in the target task in a first time period in the map, and the first region being a region in the map other than the third region.

Examples implemented by the foregoing modules and corresponding steps and application scenarios of the foregoing modules and corresponding steps are the same, but are not limited to the content disclosed in the foregoing embodiments. The foregoing modules may be run in the hardware environment shown in FIG. 1 as a part of the apparatus, and may be implemented by software, or may be implemented by hardware. The hardware environment includes a network environment.

According to another aspect of the embodiments, a server or a terminal for implementing the foregoing region adjustment method is further provided.

Figure 11:
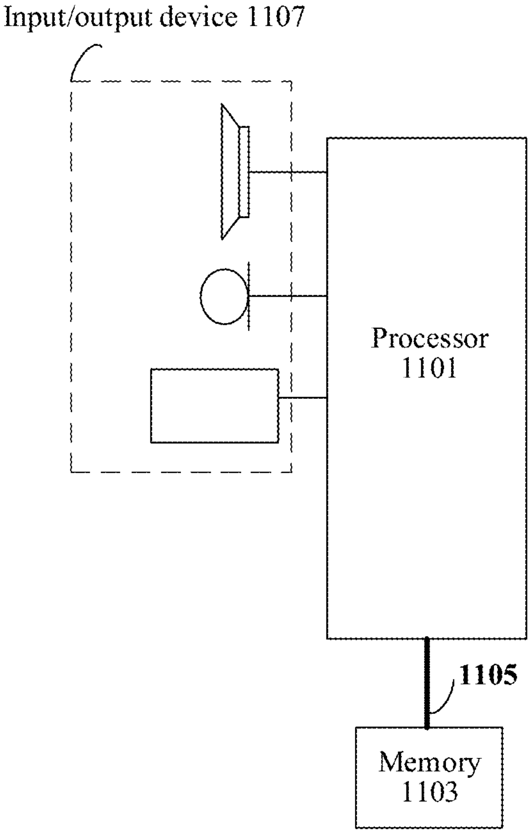
FIG. 11 is a structural block diagram of a terminal according to an embodiment.

FIG. 11 is a structural block diagram of a terminal according to an embodiment. As shown in FIG. 11, the terminal may include: one or more processors 1101 (only one is shown in FIG. 11), a memory 1103, and a transmission apparatus 1105. As shown in FIG. 11, the terminal may further include an input/output device 1107.

The memory 1103 may be configured to store a software program and a module, for example, a program instruction/module/code corresponding to the region adjustment method and apparatus in the embodiments, and the processor 1101 performs various functional applications and data processing by running the software program and the module stored in the memory 1103, that is, implementing the foregoing region adjustment method. The memory 1103 may include a high-speed random memory, and may further include a non-volatile memory such as one or more magnetic storage apparatuses, a flash memory, or another non-volatile solid-state memory. In some examples, the memory 1103 may further include memories remotely disposed relative to the processor 1101, and these remote memories may be connected to a terminal through a network. Examples of the network include but are not limited to, the Internet, an intranet, a local area network, a mobile communication network, and a combination thereof.

The transmission apparatus 1105 is configured to receive or send data by using a network, or may further be configured to transmit data between the processor and the memory. Specific examples of the foregoing network may include a wired network and a wireless network. In an example, the transmission apparatus 1105 includes a network interface controller (NIC), and the NIC may be connected to another network device and a router via a network cable to communicate with the Internet or a local area network. In an example, the transmission apparatus 1105 is a radio frequency (RF) module, configured to communicate with the Internet in a wireless manner.

Specifically, the memory 1103 is configured to store an application or program.

The processor 1101 may be configured to, by using the transmission apparatus 1105, access at least one code stored in the memory 1103, to perform the following steps: determining a region allowing a target object to move in a map, the region including a first region that allows the target object to move without being harmed and participate in a target task in the map, and determining scene objects being set in the map; obtaining object types of the scene objects in a plurality of sub-regions of the first region; based on a sub-region among the plurality of sub-regions in which an object type of a scene object meeting a target condition in the first region, determining the sub-region in which the object type meets the target condition as a second region; and narrowing or switching the region allowing the target object to move from the first region to the second region.

According to an embodiment, a terminal determines a region allowing a target object to move in a map as a first region, the region allowing the target object to move is a region in the map that does not cause harm to the target object participating in a target task in the map, and scene objects are set in the map; the terminal obtains object types of the scene objects in sub-regions of the first region; the terminal determines, based on an object type of a scene object of a sub-region that exists in the first region meeting a target condition, the sub-region in which the object type meets the target condition as a second region; and the terminal narrows, in the map, the region allowing the target object to move from the first region to the second region. For example, the region allowing the target object to move is narrowed from the first region to the second region, that is, a safe region narrows continuously. In a game process, players can only move toward the safe region as the safe region narrows, thus avoiding influence of infinite hiding on the game process, so that a game can end within a controllable time period. Moreover, the narrowed second region does not include geographical scenes unsuitable for combat or includes relatively less geographical scenes unsuitable for combat, thus resolving the technical problem of relatively high user operation complexity in related technologies, thereby achieving a technical effect of reducing user operation complexity.

For a specific example in this embodiment, reference may be made to the example described in the foregoing embodiment, and details are not described herein again in this embodiment.

A person of ordinary skill in the art may understand that the structure shown in FIG. 11 is merely an example, and the terminal may be a terminal device such as a smartphone (for example, an Android mobile phone or an iOS mobile phone), a tablet computer, a palmtop computer, a mobile Internet device (MID), or a PAD. The embodiment shown in FIG. 11 does not limit the structure of the electronic apparatus. For example, the terminal may further include more or fewer components (for example, a network interface and a display apparatus) than those shown in FIG. 11, or have a configuration different from that shown in FIG. 11.

A person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a ROM, a (RAM, a magnetic disk, an optical disc, or the like.

An embodiment of the disclosure further provides a storage medium. In this embodiment, the storage medium may be configured to perform program code of a region adjustment method.

The storage medium may be located in at least one network device in a plurality of network devices in networks shown in the foregoing embodiments.

The storage medium is configured to store program code for performing the following steps: determining a region allowing a target object to move in a map as a first region, the region allowing the target object to move being a region in the map that does not cause harm to the target object participating in a target task in the map, and scene objects being set in the map; obtaining object types of the scene objects in sub-regions of the first region; determining, based on an object type of a scene object of a sub-region that exists in the first region meeting a target condition, the sub-region in which the object type meets the target condition as a second region; and narrowing, in the map, the region allowing the target object to move from the first region to the second region.

For a specific example in this embodiment, reference may be made to the example described in the foregoing embodiment, and details are not described herein again in this embodiment.

In this embodiment, the storage medium may include, but is not limited to, various media such as a USB flash drive, a ROM, a RAM, a removable hard disk, a magnetic disk, or an optical disc that can store the program code.

The sequence numbers of the foregoing embodiments are only for description purpose and do not indicate the preference of the embodiments.

When the integrated unit in the embodiments is implemented in the form of a software function unit and sold or used as an independent product, the integrated unit may be stored in a computer-readable storage medium. In addition, one or more embodiments may be implemented in a form of a software product. The computer software product may be stored in a storage medium and include one or more instructions for instructing one or more processor or computer devices (which may be a personal computer, a server, a network device, or the like) to perform all or some of the steps of the methods described in the embodiments.

In the embodiments, the descriptions of the embodiments have their respective focuses. For a part that is not described in detail in an embodiment, refer to related descriptions in other embodiments.

It is to be understood that the client may be implemented in other manners. The apparatus embodiments described above are merely exemplary. For example, the division of the units is merely the division of logic functions, and may use other division manners during actual implementation. For example, a plurality of units or components may be combined, or may be integrated into another system, or some features may be omitted or skipped. In addition, the coupling, or direct coupling, or communication connection between the displayed or discussed components may be the indirect coupling or communication connection by using some interfaces, units, or modules, and may be electrical or of other forms.

The term used in the embodiments of the disclosure such as "unit" or "module" indicates a unit for processing at least one function or operation, and may be implemented in hardware, software, or in a combination of hardware and software.

The term "unit" or "module" may be implemented by a program that is stored in an addressable storage medium and executable by a processor.

For example, the term "unit" or "module" may include software components, object-oriented software components, class components and task components, processes, functions, attributes, procedures, subroutines, segments of a program code, drivers, firmware, microcode, circuitry, data, databases, data structures, tables, arrays, and/or variables.

For example, the term "unit" or "module" may be implemented using one or more processors (or processors and memory). Likewise, a processor (or processor and memory) can be used to implement one or more modules or units. Moreover, each module or unit can be part of an overall module or unit that includes the functionalities of the module or unit.

The units described as separate parts can or cannot be physically separate. Parts displayed as units can or cannot be physical units, and can be located in one position, or can be distributed on a plurality of network units. Some or all of the units may be selected according to actual requirements to make and practice the embodiments of the disclosure.

In addition, functional units in the embodiments can be integrated into one processing unit, or each of the units may be physically separated, or two or more units may be integrated into one unit. The integrated unit may be implemented in the form of hardware, or may be implemented in the form of a software function unit.

The foregoing descriptions are only exemplary embodiments of the disclosure. A person of ordinary skill in the art may make modifications, replacements, and improvements without departing from the scope of the disclosure, and the modifications, replacements, and improvements thereof shall fall within the protection scope of this disclosure.

What is claimed is:

1. A region adjustment method, performed by an electronic device, the method comprising:
- determining a region allowing a virtual character controlled by a user to move in a map, wherein the region comprises a first region that allows the virtual character to move without being harmed;
- based on a sub-region of the first region having a scene object making the sub-region suitable for combat, determining the sub-region as a second region; and
- switching the region allowing the virtual character to move from the first region to the second region without being harmed.

2. The method of claim 1, wherein the scene object is an environment object, comprising one or more of:
- a mountain, a river, a lake, a seaside, an oceanside, a cliff, a building, a roadway, a grassland, or a tree.

3. The method according to claim 1, wherein the method further comprises:
- displaying a narrowing of the region from the first region to the second region for the virtual character to move from the first region to the second region.

4. The method according to claim 3, wherein the displaying the narrowing comprises:
- displaying one or more first scene objects making the region suitable for combat, and
- excluding from display, one or more second scene objects making the region unsuitable for combat.

5. The method according to claim 1, wherein the determining the sub-region as the second region comprises:
- obtaining a whitelist associated with the first region, the whitelist comprising a list of scene objects;
- searching the whitelist for one or more first scene objects making a respective sub-region suitable for combat; and
- determining the sub-region in which more than one first scene object exists as the second region.

6. The method according to claim 5, wherein determining the sub-region in which the more than one first scene object exists as the second region comprises:
- based on determining that a number of first scene objects in the sub-region is more than a number of second scene objects, setting the sub-region as the second region,
  - wherein the second scene objects are scene objects that make a respective sub-region unsuitable for combat.

7. The method according to claim 5, wherein determining the sub-region in which the more than one first scene object exists as the second region comprises:
- based on determining that a number of second scene objects in the sub-region is less than a predetermined number, setting the sub-region as the second region,
  - wherein the second scene objects are scene objects that make a respective sub-region unsuitable for combat.

8. The method according to claim 1, wherein the method further comprises:
- obtaining a first parameter matching a second time period, the second time period being a time period in which the region allowing the virtual character to move is the second region, wherein a start time of the second time period is not earlier than an end time of a first time period, the first time period being a time period in which the region allowing the virtual character to move is the first region; and determining the first parameter as a first radius of the second region, and a second parameter as a second radius of the first region, the second parameter being greater than the first parameter.

9. The method according to claim 8, wherein the determining the first parameter as the first radius of the second region comprises:

generating a random number r by using a random number generator, the random number r being a number between 0 and 1;

determining a radius of an angle $r*\pi$ in the first region as a target radius;

searching, based on the target radius, for a point that is distant from a center of circle of the first region by a third parameter; and determining the point as a center of the second region, the third parameter being a product of a square root of the random number r and a fourth parameter, the fourth parameter being a difference between the second radius of the first region and the first radius of the second region.

10. The method according to claim 1, wherein the method further comprises:

dividing the map into the first region and a third region, the third region being a region that causes harm to the virtual character participating in a target task in a first time period in the map, and the first region being a region in the map other than the third region.

11. A region adjustment apparatus, comprising:

at least one memory configured to store computer program code; and at least one processor configured to access the memory and operate as instructed by the computer program code, the computer program code comprising:

first determining code configured to cause the at least one processor to determine a region allowing a virtual character controlled by a user to move in a map, wherein the region comprises a first region that allows the virtual character to move without being harmed;

second determining code configured to cause the at least one processor to, based on a sub-region of the first region having a scene object making the sub-region suitable for combat, determining the sub-region as a second region; and adjustment code configured to cause the at least one processor to switch the region allowing the virtual character to move from the first region to the second region.

12. The apparatus according to claim 11, wherein the scene object is an environment object, comprising one or more of:

a mountain, a river, a lake, a seaside, an oceanside, a cliff, a building, a roadway, a grassland, or a tree.

13. The apparatus according to claim 11, wherein the program code further comprises:

first displaying code configured to cause the at least one processor to display a narrowing of the region from the first region to the second region for the virtual character to move from the first region to the second region.

14. The apparatus according to claim 13, wherein the first displaying code comprises:

second displaying code configured to cause the at least one processor to display one or more first scene objects making the region suitable for combat, and third displaying code configured to cause the at least one processor to excluding from display, one or more second scene objects making the region unsuitable for combat.

15. The apparatus according to claim 11, wherein the program code further comprises:

first obtaining code configured to cause the at least one processor to obtain a first parameter matching a second time period, the second time period being a time period in which the region allowing the virtual character to move is the second region, wherein a start time of the second time period is not earlier than an end time of a first time period, the first time period being a time period in which the region allowing the virtual character to move is the first region; and third determining code configured to cause the at least one processor to determine the first parameter as a first radius of the second region, and a second parameter as a second radius of the first region, the second parameter being greater than the first parameter.

16. The apparatus according to claim 15, wherein the program code further comprises:

dividing code configured to cause the at least one processor to divide the map into the first region and a third region, the third region being one that causes harm to the virtual character participating in a target task in a first time period in the map, and the first region being the region in the map other than the third region.

17. A non-transitory computer-readable storage medium, storing at least one computer program code, the at least one computer program code, when executed by a processor, causes the processor to:

determine a region allowing a virtual character controlled by a user to move in a map, wherein the region comprises a first region that allows the virtual character to move without being harmed;

based on a sub-region of the first region having a scene object making the sub-region suitable for combat, determine the sub-region as a second region; and switch the region allowing the virtual character to move from the first region to the second region without being harmed.

18. The non-transitory computer-readable storage medium according to claim 17, wherein the scene object is an environment object, comprising one or more of:

a mountain, a river, a lake, a seaside, an oceanside, a cliff, a building, a roadway, a grassland, or a tree.

19. The non-transitory computer-readable storage medium according to claim 17, wherein the at least one computer program code is further executed by the processor to:

display a narrowing of the region from the first region to the second region for the virtual character to move from the first region to the second region.

20. The non-transitory computer-readable storage medium according to claim 19, wherein the display the narrowing of the region comprises:

displaying one or more first scene objects making the region suitable for combat, and excluding from display, one or more second scene objects making the region unsuitable for combat.

* * * * *